United States Patent Office 3,541,078
Patented Nov. 17, 1970

3,541,078
AMINE COMPOUNDS AND METHODS FOR THEIR PRODUCTION
Peter W. K. Woo, Detroit, George L. Coffey, St. Clair Shores, Henry W. Dion, Detroit, Salvatore A. Eusari, St. Clair Shores, and Georgia D. Senos, Warren, Mich., assignors to Parke, Davis & Company, Detroit, Mich., a corporation of Michigan
No Drawing. Continuation of application Ser. No. 715,570, Mar. 25, 1968. This application May 15, 1968, Ser. No. 729,438
Int. Cl. C07c 47/18, 29/18
U.S. Cl. 260—210     8 Claims

ABSTRACT OF THE DISCLOSURE $N^1$ - (4-amino-2-hydroxybutyryl)-4-O-(2,6-diamino-2,6-dideoxy-D-glucopyranosyl)-5-O-D-xylofuranosyl-2-deoxystreptamine and $N^1$ - (4-amino-2-hydroxybutyryl)-4-O-(2,6 - diamino - 2,6-dideoxy-D-glucopyranosyl)-5-O-D-ribofuranosyl-2-deoxystreptamine and acid-addition salts. The compounds can be produced by fermentation of suitable strains of Bacillus circulans under artificial conditions. The compounds have a wide spectrum of antibacterial activity.

CROSS REFERENCE TO RELATED APPLICATION

This is a continuation of our co-pending application Ser. No. 715,570, filed Mar. 25, 1968, now abandoned.

SUMMARY AND DETAILED DESCRIPTION

The present invention relates to new chemical compounds. More particularly, it relates to a chemical substance called ambutyrosin, to individual components thereof called ambutyrosin A and ambutyrosin B, to acid-addition salts, and to methods for the production of the foregoing compounds.

The primary product of the invention, as it is normally produced in the free base form, has been given the name ambutyrosin, as indicated above. Ambutyrosin can be isolated, identified, characterized, and used as such. Alternatively, ambutyrosin can be separated into individual components called ambutyrosin A and ambutyrosin B and each of these can be isolated, identified, characterized, and used separately. In addition, ambutyrosin, ambutyrosin A, and ambutyrosin B can be isolated, identified, characterized, and used either in free base or acid-addition salt form. When not otherwise qualified, the term ambutyrosin, as used herein, refers to a mixture of ambutyrosin A and ambutyrosin B, or to either component when the distinction between them is of no significance. Ambutyrosin, as normally obtained from fermentation broths according to the invention, contains a major proportion of ambutyrosin A and a minor proportion (up to 10–15%) of ambutyrosin B.

Ambutyrosin A, ambutyrosin B, and mixtures thereof are stable, white, solid bases which are very soluble in water, moderately soluble in methanol, and slightly soluble in ethanol. The free bases form acid-addition salts with a variety of organic and inorganic acids such as acetic, propionic, maleic, malic, citric, gluconic, hydrochloric, hydrobromic, phosphoric, sulfuric, and related acids. Each of the free bases has four primary amino groups and all four of these groups can form acid-addition salts. With lesser quantities of acid some of the amino groups remain in free base form.

Ambutyrosin A melts with decomposition over a wide range beginning at about 149° C. in a sealed capillary tube. It has pK'a values of 5.6, 7.3, 8.7, and 9.8. It has a characteristic infrared absorption spectrum in potassium bromide with absorption maxima at 700, 1028, 1090, 1340, 1390, 1457, 1498, 1550 to 1610, 1652, 2938, 3040, and 3410 reciprocal centimeters. It shows no ultraviolet absorption maxima between 220 and 360 millimicrons. The specific rotation $[\alpha]_D^{25} = +26°$ (1.46% in water).

Ambutyrosin B can be obtained in the form of a substance having the analysis of a dihydrate and melting with decomposition over a wide range beginning at about 146° C. in a sealed capillary tube. It has pK'a values of 5.3, 7.1, 8.6, and 9.8. It has a characteristic infrared absorption spectrum in potassium bromide with absorption maxima at 700, 1026, 1100, 1345, 1390, 1458, 1497, 1549, 1580, 1650, 2938, 3040, 3315, and 3370 reciprocal centimeters. It shows no ultraviolet absorption maxima between 220 and 360 millimicrons. The specific rotation $[\alpha]_D^{25} = +33°$ (1.5% in water).

By virtue of their functional groups, ambutyrosin A and ambutyrosin B each form a large number of important and characteristic chemical derivatives such as the tetra-N-acetyl derivatives and the tetra-N-methanesulfonate derivatives. Tetra-N-acetyl ambutyrosin A has a specific rotation $[\alpha]_D^{25} = +25°$ (2.11% in water). Tetra-N-acetyl ambutyrosin B has a specific rotation $[\alpha]_D^{25} = +33°$ (1.34% in water).

Acid hydrolysis of ambutyrosin A under relatively mild conditions, for example 0.4 N hydrochloric acid at 65° C., yields D-xylose. Acid hydrolysis of ambutyrosin B under the same mild conditions yields D-ribose but no D-xylose.

More vigorous acid hydrolysis of either ambutyrosin A or ambutyrosin B, for example 6 N hydrochloric acid at the reflux temperature for 6 hours, yields neamine, deoxystreptamine, neosamine C, and α-hydroxy-γ-aminobutyric acid. The α-hydroxy-γ-aminobutyric acid is characterized as a crystalline substance having M.P. 212.5–214.5° C.; specific rotation $[\alpha]_D^{25} = -28.2°$ (1.22% in water).

Further extensive structural determinations have been carried out on ambutyrosin A and ambutyrosin B. In anhydrous free base form each has the empirical formula $C_{21}H_{41}N_5O_{12}$.

The structure of ambutyrosin A has been determined as $N^1$ - (4-amino-2-hydroxybutyryl)-4-O-(2,6-diamino-2,6-dideoxy - D - glycopyranosyl)-5-O-D-xylofuranosyl-2-deoxystreptamine of the structural formula

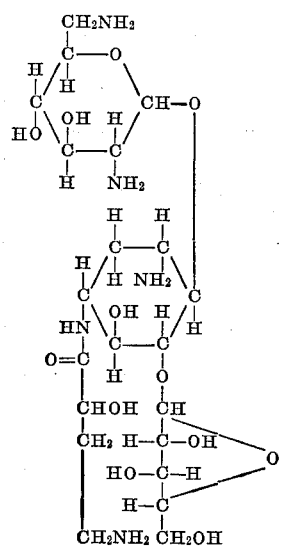

The structure of ambutyrosin B has been determined as $N^1$-(4-amino-2-hydroxybutyryl)-4-O-(2,6-diamino-2,6- dideoxy - D - glucopyranosyl) - 5 - O - D - ribofuranosyl-
2-deoxystreptamine of the structural formula

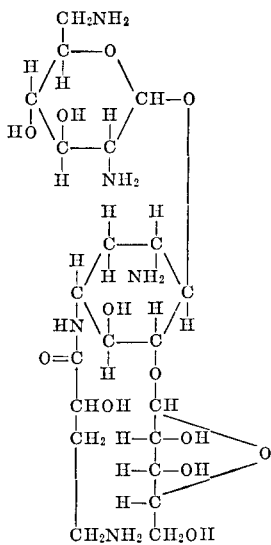

Thus, ambutyrosin A and ambutyrosin B are isomers differing in the configuration at one carbon atom in the pentose moiety.

Ambutyrosin and its components, ambutyrosin A and ambutyrosin B, have similar spectra of antibacterial activity, which can be illustrated by the antibacterial spectrum of ambutyrosin sulfate salt, as shown in the following Table 1. In this table the antibacterial spectrum of ambutyrosin sulfate is expressed in terms of the minimal inhibitory concentration, measured as micrograms of free base equivalent per ml. of medium, against various species of bacteria pathogenic for humans. The data reported in Table 1 were obtained using commonly encountered strains of the designated organisms. Where more than a single strain of an organism is indicated, the range of minimal inhibitory concentrations is given for the purpose of illustrating the variability observed for different strains of the single species.

TABLE 1

In vitro antibacterial spectrum of ambutyrosin sulfate

| Microorganism | Number of strains | Minimal inhibitory concentration, micrograms base/ml. |
| --- | --- | --- |
| Aerobacter aerogenes | 3 | 0.8–6.3 |
| Diplococcus pneumoniae | 6 | 3.1>10 |
| Escherichia coli | 11 | 1.6–50.0 |
| Klebsiella pneumoniae | 1 | 1.6 |
| Mycobacterium tuberculosis | 1 | 1.6 |
| Proteus vulgaris | 1 | 6.3 |
| Pseudomonas aeruginosa | 25 | 4.5–35.5 |
| Salmonella enteritidis | 3 | 12.5–50.0 |
| Salmonella typhimurium | 2 | 12.5–50.0 |
| Shigella flexneri | 5 | 12.5 |
| Shigella sonnei | 5 | 3.1–12.5 |
| Staphylococcus aureus | 14 | 1.6–100 |
| Streptococcus faecalis | 1 | >100 |
| Streptococcus pyogenes | 3 | 6.3–12.5 |

The antibacterial activity of ambutyrosin sulfate has also been demonstrated in experimental acute infections in mice. Single subcutaneous doses of approximately 2 to 10 mg. base equivalent/kg. body weight are effective against infections with *Escherichia coli*, *Klebsiella pneumoniae*, *Proteus vulgaris*, and *Staphylococcus aureus*.

The mean single dose of ambutyrosin, administered as the sulfate, that is lethal for half the mice in a group (acute $LD_{50}$) has been determined as 3050 mg. base/kg. body weight by the subcutaneous route; 2188 mg./kg. by the intraperitoneal route; and 487 mg./kg. by the intravenous route.

Ambutyrosin and acid-addition salts thereof can be produced in accordance with the invention, by cultivating an ambutyrosin-producing strain of the organism, *Bacillus circulans*, under artificial conditions.

The term "ambutyrosin-producing strain of *Bacillus circulans*", as used herein, means a strain of *Bacillus circulans* which, when propagated under the artificial conditions herein described, yields a fermented broth from which ambutyrosin or an acid-addition salt thereof can be obtained by the procedures set forth.

A strain of *Bacillus circulans* suitable for the purposes of the invention has been obtained from a soil sample collected near Melspruit, East Transvaal, South Africa. Subcultures of this strain have been deposited with the United States Department of Agriculture, Northern Utilization Research and Development Division, Peoria, Ill. and are being maintained in their permanent culture collection under the identification numbers NRRL B–3312 and NRRL B–3313. The number NRRL B–3312 corresponds to the original isolate; and the number NRRL B–3313 corresponds to a single-colony selection. The two deposited subcultures are essentially equivalent in morphological and physiological characteristics. As used herein, the designations *Bacillus circulans* NRRL B–3312 and *Bacillus circulans* NRRL B–3313 refer to a strain of *Bacillus circulans* having the characteristics described below and are not limited to a specific culture of the organism such as may be found in a particular culture collection.

The critical identification studies were carried out on NRRL B–3313 following "Bergey's Manual of Determinative Bacteriology," Seventh Edition (1957). The media and methods used for the identification of the organism are from Smith, Gordon, and Clark, Aerobic Sporeforming Bacteria, Agricultural Monograph 16, U.S. Department of Agriculture (1952) and Society of American Bacteriologists, Manual of Microbiological Methods (1957).

The organism is an aerobic, Gram-variable, motile rod (0.3 to 0.9 by 1.1 to 4.7 microns); grows on meat extract or other complex organic media; and forms endospores. Hence it belongs in the genus Bacillus. Its sporangia are definitely swollen. Its spores are ellipsoidal, rarely cylindrical, central to terminal, and the spore wall is thick and easily stained. It is Gram-variable. In the key to the species of the genus Bacillus (Bergey's Manual, pages 613–615), the organism, therefore, belongs among the species in II (page 615). It does not produce gas from carbohydrates, is saprophytic, grows on ordinary media, hydrolyzes starch, does not produce indole or acetylmethylcarbinol and does not grow at 65° C. It therefore belongs in B., 1., a., bb., cc. Only one species, *B. circulans*, occupies this area of the key. In the tests performed and shown in the following Table 2, the organism does not differ significantly from *B. circulans*, Jordan, 1890, emend. Ford, 1916, as described in Bergey's Manual, pages 628 and 629. The organism is therefore regarded as a strain of the species *B. circulans*.

In comparative studies, *B. circulans* NRRL B–3313 differs in several respects from the American Type Culture Collection (ATCC) strain 4513 (proposed neotype, N. R. Smith et al., "Type cultures and proposed neotype cultures of some species of the genus Bacillus," J. Gen. Microbiol, 34: 269–272, 1964). The differences include size of vegetative cells and spores, thickness of spore wall, growth at 45° C., growth characteristics on nutrient agar, hydrolysis of gelatin and casein, citrate utilization, reoxidation of methylene blue, and fermentation of L-arabinose, inulin, lactose, and D-xylose.

The characteristics of NRRL B–3313 and comparison with ATCC 4513 are shown in Table 2.

TABLE 2

Characteristics of *Bacillus circulans* NRRL B-3313 and comparison with ATCC 4513

| Characteristic, on designated medium | NRRL B-3313 | ATCC 4513 |
|---|---|---|
| Appearance: | | |
| Bacto-Nutrient Agar (Difco), 24 hour growth at 28° C.; Hucker's modification of Gram stain. | Gram-variable, usually single rods with rounded or pointed ends, 0.3 to 0.9 by 1.1 to 4.7 microns. | Gram-variable, usually single rods with rounded ends, 0.3 to 1.0 by 2.0 to 6.5 microns. |
| Bacto-Peptone Iron Agar (Difco) plus 0.1 percent Bacto-Yeast Extract (Difco), growth at 28° C. Conklin's spore stain. | Good sporulation at 2 days; sporangia bulged and clavate; spores ellipsoidal, occasionally reniform, terminal and subterminal; spore wall thick; spores 0.6 to 1.3 by 1.1 to 2.3 microns. | Good sporulation at 5 days; sporangia bulged and clavate; spores ellipsoidal, occasionally spherical, usually terminal; spore wall thin; spores 0.4 to 1.1 by 0.8 to 1.5 microns. |
| Motility: | | |
| Bacto-Nutrient Broth (Difco), 24 hour growth at 28° C. | Motile | Motile. |
| Growth temperature Bacto-Nutrient Agar (Difco): | | |
| 28° C | Positive | Positive. |
| 37° C | do | Do. |
| 45° C | Negative | Do. |
| 65° C | do | Negative. |
| Growth characteristics in broth: | | |
| Surface | None | None. |
| Subsurface | Turbid | Turbid. |
| Amount | Moderate | Moderate. |
| Sediment | White flocculent | White flocculent. |
| Colony characteristics Bacto-Nutrient Agar (Difco): | | |
| Form | Circular, few punctiform | Irregular, few circular. |
| Elevation | Convex | Flat. |
| Margin | Entire | Undulate to erose. |
| Surface | Smooth | Smooth. |
| Density | Translucent | Translucent. |
| Consistency | Viscid to butyrous | Butyrous. |
| Color | Colorless to whitish | Colorless to whitish, slightly irridescent. |
| Gelatin hydrolysis: | | |
| Bacto-Nutrient Agar (Difco) plus 0.4 percent Bacto-Gelatin (Difco). | 35 to 37 mm. zone at 7 days | 1 to 2 mm. zone at 7 days. |
| Bacto-Gelatin (Difco) Stab. | Liquefaction at 5 days | No liquefaction at 5 and 13 days. |
| Casein hydrolysis | Negative at 6 days, positive at 13 days. | Negative at 6 and 13 days. |
| Indole production | Negative at 5 and 13 days | Negative at 5 and 13 days. |
| Reduction of nitrate to nitrite | Negative at 5 and 13 days | Negative at 5 and 13 days. |
| Acetylmethyl-carbinol production. | Negative at 2, 6, and 13 days; pH of broth at 6 days 5.8. | Negative at 2, 6, and 13 days; pH of broth at 6 days 5.8. |
| Starch hydrolysis | Positive at 6 days, 1 to 2 mm. zone. | Positive at 6 days, 4 to 5 mm. zone. |
| Citrate utilization | Negative at 6 days, positive at 13 days. | Negative at 6 and 13 days. |
| Methylene blue reduction | Positive at 2, 5, and 13 days | Positive at 2 days, reoxidized at 5 days. |

| Fermentation (28° C.) ammonium salts agar: | Acid | Gas | Acid | Gas |
|---|---|---|---|---|
| L-arabinose | − | − | + | − |
| Dextrin | + | − | + | − |
| D-fructose | + | − | + | − |
| D-galactose | + | − | + | − |
| D-glucose | + | − | + | − |
| Glycerol | + | − | + | − |
| Inulin | − | − | + | − |
| Lactose | − | − | + | − |
| Maltose | + | − | + | − |
| D-mannitol | + | − | + | − |
| D-mannose | + | − | + | − |
| Raffinose | + | − | + | − |
| Salicin | ± | − | + | − |
| Sucrose | + | − | + | − |
| D-xylose | − | − | + | − |
| Bacto-Phenol Red Broth (Difco): | | | | |
| L-Arabinose | − | − | | |
| D-Glucose[1] | + | − | + | − |
| D-Mannitol | + | − | | |
| Sucrose | + | − | | |

[1] pH after 6 days.

Certain media mentioned in Table 2 have the compositions indicated below. It is also satisfactory to use media of similar compositions.

Bacto-Nutrient Agar (Difco) contains 3 g. of beef extract, 5 g. of peptone, and 15 g. of agar, dissolved in 1000 ml. of distilled water.

Bacto-Peptone Iron Agar (Difco) contains 15 g. of peptone, 5 g. of proteose peptone, 0.5 g. of ferric ammonium citrate, 1 g. of dipotassium phosphate, 0.08 g. of sodium thiosulfate, and 15 g. of agar, dissolved in 1000 ml. of distilled water.

Bacto-Yeast Extract (Difco) is the water soluble portion of autolyzed yeast, containing the naturally-occurring B-complex vitamins.

Bacto-Nutrient Broth (Difco) contains 3 g. of beef extract and 5 g. of peptone, dissolved in 1000 ml. of distilled water.

Bacto-Gelatin (Difco) is a high grade gelatin in granular form.

Bacto-Phenol Red Broth Base (Difco) contains 1 g. of beef extract, 10 g. of proteose peptone, 5 g. of sodium chloride, and 0.018 g. of Phenol Red, dissolved in 1000 ml. of distilled water.

In accordance with the invention, ambutyrosin and acid-addition salts thereof are produced by inoculating an aqueous nutrient medium containing sources of assimilable carbon and nitrogen with an ambutyrosin-producing strain of the organism *Bacillus circulans* and incubating the inoculated medium at a temperature between about 20 to 40° C. under aerobic conditions. According to the usual method of operation, the aqueous nutrient medium is sterilized prior to inoculation and the incubation of the inoculated medium is carried out under aseptic, aerobic conditions until substantial antibacterial activity has been imparted to the fermentation mixture, following which ambutyrosin is isolated in free base or acid-addition salt form by further treatment of the fermentation mixture. The preferred conditions for carrying out the fermentation are a temperature between 28 and 32° C. and a pH between 6.0 and 8.0, especially about 7.5.

Inoculum for the production of ambutyrosin by the cultivation of a suitable strain of *Bacillus circulans* can be obtained by employing surface growth from slants of a nutrient agar medium. When incubated at a temperature between about 25 and 32° C., the organism grows and produces confluent growth in one to two days. Incubation for 2 days or longer is necessary to produce a completely sporulated culture, which is desirable but not essential for the purpose of the invention. Generally, sporulated cultures are used to inoculate an aerated and agitated liquid nutrient medium contained in a suitable vessel such as a shaken flask or stirred and aerated fermentor. The microorganism is allowed to germinate and grow for 24 to 48 hours at a temperature of 20 to 40° C., preferably 26 to 32° C. This growing seed is then used to inoculate production fermentors or other seed fermentors.

As indicated above, suitable aqueous nutrient media are those containing sources of assimilable carbon and nitrogen. Sources of carbon which are assimilable and satisfactory for use include pure carbohydrates and polyhydric alcohols which can be utilized by the organism, as well as commercially-available carbohydrate mixtures. Some examples of materials which are suitable for this purpose are starches, corn meal, sugars, and glycerol. The quantity of the carbohydrate or polyhydric alcohol present in the nutrient medium is not particularly critical and commonly varies from about 0.5 to 5% by weight of the medium. Quantities somewhat outside of this range can also be used.

The sources of nitrogen in the nutrient medium can be of an organic, inorganic, or mixed organic-inorganic nature. Some examples of the many nitrogenous substances which can be employed are casein, soybean meal, peanut meal, cottonseed meal, wheat gluten, barley or oat tailings, lactalbumin, enzymatic digest of casein, tryptone, meat peptone, ammonium chloride, and ammonium sulfate. Due to the crude nature of many of the readily available nitrogen sources, the quantity to be added to the medium varies according to the purity and it is not readily possible to specify a definite quantity of nitrogenous source material which should be added to the medium. However, the nitrogenous source materials usually do not exceed 5 to 6% by weight of the total fermentation medium and in most cases they are present in a lower amount.

The presence of small amounts of auxiliary growth factors in the fermentation medium is also desirable. Some of those factors are already present in the ordinary crude organic nitrogen sources and need not be added separately. Alternatively, small amounts of such materials as distiller's solubles, yeast, yeast autolysate, yeast extract, and molasses fermentation residues; inorganic salts such as sodium chloride, potassium phosphate, and magnesium sulfate; and salts of trace metals such as zinc, copper, manganese, iron, and cobalt, can be added to the fermentation mixture.

The aqueous nutrient medium prepared as indicated above is, if necessary, adjusted to a pH between about 6.0 and 8.0, preferably about 7.5. A buffering agent, such as calcium carboante, can also be added to maintain the pH within the desired limits as the fermentation proceeds. An antifoaming agent can also be added as required.

The cultivation of the ambutyrosin-producing strain of *Bacillus circulans* in the aqueous nutrient medium can be carried out in a number of different ways. For example, the organism can be cultivated under aerobic conditions on the surface of the medium; or it can be cultivated beneath the surface of the medium, that is in the submerged condition, provided that an adequate supply of oxygen is furnished.

The preferred method for producing ambutyrosin and acid-addition salts thereof according to this invention is by the fermentation of an ambutyrosin-producing strain of *Bacillus circulans* in a submerged or deep culture, using as inoculum a growing, 24 to 48-hour old, aerated and agitated broth culture of the organism. According to this method, a sterile aqueous nutrient medium is inoculated with the organism and incubated with agitation and aeration at a temperature between about 20 and 40° C., preferably in the neighborhood of 28–32° C., until a high concentration of ambutyrosin is present in the culture liquid. The length of time required for the maximum yield varies with the size and type of equipment used, the rates of agitation and aeration, and other factors. In large scale fermentations carried out in tank-type fermentors, maximum production is usually reached in about 3 to 6 days.

The quantity of ambutyrosin present in the broth after the fermentation period or at any time during the fermentation period can be determined by bioassay. The antibacterial activity (representing ambutyrosin content) of the broth is determined by measuring the inhibition in the growth of the microorganism, *Escherichia coli* (or other susceptible organism) on a test tray, and comparing the result with the inhibition caused by an appropriate dilution of a reference sample of purified ambutyrosin, obtained as described hereinafter.

At the completion of the fermentation period ambutyrosin or an acid-addition salt theerof can be obtained from the broth by procedures described below and can be subjected to the degree of further purification desired, including separation into the components ambutyrosin A and ambutyrosin B.

Ambutyrosin can be obtained from the broth in any of a number of ways. For example, the broth is treated with a carboxylic acid resin in the ammonium form to absorb the ambutyrosin on the resin. The resin is collected and the ambutyrosin is removed by elution with a base such as 1M ammonium hydroxide. For purification, the adsorption on resin and elution with base can be repeated one or more times.

Ambutyrosin can be separated into the components ambutyrosin A and ambutyrosin B by a number of different methods. A preferred method involves adsorption on a strong anion exchange resin in the borate form followed by selective elution of the components. Separation by selective elution occurs presumably because ambutyrosin B has adjacent cis hydroxyl groups in the ribose moiety and forms a borate complex; whereas ambutyrosin A does not have adjacent cis hydroxyl groups in the xylose moiety and does not form a borate complex. When the ambutyrosin is adsorbed on the strong anion exchange resin in the borate form, the ambutyrosin A component is removed first by elution with water and the ambutyrosin B component is removed subsequently by elution with 5% boric acid solution. Each component can be further purified by adsorption on a carboxylic acid resin, ammonium form, and elution with 1 M ammonium hydroxide. Residual amounts of boron in the product can be removed with a boron-specific anion exchange resin.

According to another method of separating ambutyrosin into its components, the ambutyrosin mixture is converted to the tetra-N-acetyl derivatives and these derivatives are subjected to partition chromatography on diatomaceous earth using systems such as 1-butanol, water, pyridine (10:10:3) or 1-butanol, 5% boric acid, pyridine (10:10:3). Mixtures of the two components can be separated and the components readily distinguished from one another by paper chromatography of the tetra-N-acetyl derivatives using 1-butanol, pyridine, 5% boric acid (6:4:3); $R_f$ tetra-N-acetyl ambutyrosin A, 0.30–0.38; $R_f$ tetra-N-acetyl ambutyrosin B, 0.16–0.20. The tetra-N-acetyl derivatives can be detected on paper by using a modification of the general method of Pan and Dutcher, Analytical Chemistry, 28, 836 (1956), chlorine gas being used instead of sodium hypochlorite. In order to obtain the tetra-N-acetyl derivatives for use in the above procedures, 7.50 g. of ambutyrosin is dissolved in 150 ml. of acetic anhydride and 430 ml. of methanol. The solution is held at 25° C. for 48 hours and the reaction mixture then added to 3 liters of diethyl ether. The resulting precipitate of the tetra-N-acetyl derivatives is collected on a filter and dried. The tetra-N-acetyl derivative of either component can be obtained similarly.

Ambutyrosin and its components can be converted to pharmaceutically-acceptable acid-addition salts by reaction with any of a large number of acids such as acetic, propionic, maleic, malic, citric, gluconic, hydrochloric, hydrobromic, phosphoric, sulfuric, and related acids.

Ambutyrosin, its individual components, and acid-addition salts thereof are antibacterial agents having a wide spectrum of antibacterial activity. An outstanding property of these substances is their relatively high activity against *Pseudomonas aeruginosa* both in vitro and in vivo. The compounds can be administered either orally, parenterally, or topically. In humans, single intramuscular doses of ambutyrosin sulfate salt corresponding to 4 mg. of ambutyrosin base per kilogram of body weight are well tolerated and give bacteriostatic drug concentrations in the blood plasma and in the urine.

Because of their wide antibacterial spectrum and bactericidal as well as bacteriostatic activity, the compounds of the invention are also useful as antibacterial agents in in vitro applications such as sterilizing laboratory instruments and surfaces, sterilizing pharmaceutical products, and maintaining sterile conditions during pharmaceutical manufacturing operations. For sterilizing laboratory instruments and surfaces and similar in vitro applications, the compounds can be used in the form of a 0.1 to 1.0% aqueous solution.

The invention is illustrated by the following examples.

EXAMPLE 1

Stage I: Four slant cultures of *Bacillus circulans* NRRL B–3313 are prepared on a sterile agar medium having the following composition.

G.
Peptone derived from casein by pancreatic digestion __ 15
Papaic digest of soya meal _____ 5
Sodium chloride _____ 5
Agar _____ 15
Distilled water, 1 liter.

The slants are incubated at 28° C. for 2 days and the growth from each slant is suspended in 10 ml. of 0.1% sterile sodium heptadecyl sulfate solution.

Stage II: A nutrient medium having the following composition (weight/volume) is prepared.

Percent
Soybean meal, 44% protein (solvent extracted) ___ 1.0
Animal peptone _____ 1.75
Ammonium chloride _____ 0.4
Water to make 100%.

The pH of the medium is adjusted to 7.5 with 10 N sodium hydroxide and then 0.5% (weight/volume) of calcium carbonate is added.

Twelve liters of this medium is place in a 30-liter fermentor. The medium is sterilized by heating at 121° C. for 90 minutes, allowed to cool, and inoculated with 40 ml. of the sodium heptadecyl sulfate spore suspension of *Bacillus circulans* NRRL B–3313, prepared as described for Stage I. The inoculated medium is incubated at 26–27° C. for 32 hours while being stirred at 200 revolutions per minute and aerated with sterile air supplied at the rate of 6 liters per minute. About 36 g. of a mixture of lard and mineral oils with mono- and diglycerides is added in portions during this time to prevent excessive foaming.

Stage III: Thirty gallons of the nutrient medium having the same composition as that used in Stage II is placed in a 50-gallon fermentor. The medium is sterilized at 121° C. for 60 minutes, allowed to cool, and inoculated with 400 ml. of the growing 32-hour old culture from Stage II. The fermentation is allowed to proceed for 32 hours at 25–27° C. with aeration at a rate of 9.5 cubic feet per minute and addition of an antifoaming agent as required.

Stage IV: A nutrient medium is prepared having a composition as described in Stage II but containing in addition 4.0% (weight/volume) of glycerol. One hundred fifty gallons of this nutrient medium is placed into each of two 200-gallon fermentors and the medium is sterilized with heat and cooled. Each fermentor is inoculated with 15 gallons of the growing 32-hour old culture from Stage III, and incubated with agitation and aeration at a rate of 17 cubic feet per minute for 122 hours at 29.5 to 30.5° C. Approximately 15 liters of antifoaming agent is added to each fermentor, in portions as required.

Isolation and purification of product: The broths from Stage IV are combined and the combined broth (305 gallons; pH 6.8) is stirred for 1 hour with 48 liters of carboxylic acid resin in the ammonium form. A resin such as Amberlite IRC–50 can be used. The resin with adsorbed material is allowed to settle and washed free of suspended solids with water. The washed resin is charged into a 6-inch diameter glass column already containing 10.5 liters of fresh carboxylic acid resin, ammonium form, as a bottom layer. The packed column is washed with 980 gallons of 0.1 M ammonium hydroxide to remove impurities and the ambutyrosin product is removed by elution with 100 gallons of 1 M ammonium hydroxide. The 1 M ammonium hydroxide eluate is concentrated to 22 liters, adjusted to pH 7 with dilute sulfuric acid, and passed through a column of 275 ml. of the same carboxylic acid resin, ammonium form, at the rate of 0.03 ml./ml. resin/minute. The resin with adsorbed material is removed from this column and placed on top of 825 ml. of fresh resin in a 2-inch diameter glass column. The column is washed with 49 liters of 0.1 M ammonium hydroxide to remove impurities and the ambutyrosin product is eluted with 4 liters of 1 M ammonium hydroxide. The ambutyrosin eluate is concentrated in vacuo to a small volume, filtered, and lyophilized to give a residue of ambutyrosin; specific rotation $[\alpha]_D^{25} = +26°$ (1.1% in water). By microanalysis, the product contains 45.41% carbon; 7.26% hydrogen; 12.83% nitrogen.

Salts with hydrochloric acid and with sulfuric acid are prepared by adding an excess of hydrochloric acid or sulfuric acid to an aqueous solution of the free base. The salt is precipitated by addition of acetone. The sulfate obtained by this procedure has a specific rotation $[\alpha]_D^{25} = +29°$ (2% in water). By microanalysis it contains 32.32% carbon; 6.20% hydrogen; 8.64% nitrogen. In water it has pK'a values of 6.5, 8.1, and 9.5.

Cultures of *Bacillus circulans* NRRL B-3312 can be substituted for the *Bacillus circulans* NRRL B-3313 in the procedures of this example with equivalent results.

EXAMPLE 2

Stage I: A spore suspension of *Bacillus circulans* NRRL B-3313 in 0.1% sterile sodium heptadecyl sulfate solution is prepared as in Example 1, Stage I.

Stage II: A fermentation is carried out as described in Example 1, Stage II except that the 12 liters of nutrient medium is inoculated with only 10 ml. of the sodium heptadecyl sulfate suspension of *Bacillus circulans* NRRL B-3313.

Stage III: A nutrient medium is prepared having the composition described in Example 1, Stage II. The pH of the medium is adjusted to 7.5 with 10 N sodium hydroxide and then 0.5% (weight/volume) of calcium carbonate and 0.1% (weight/volume) of a polypropylene glycol antifoaming agent are added. A polypropylene glycol such as Polyglycol P2000 can be used. Thirty-gallon portions of this mixture are placed in each of two 50-gallon fermentors, sterilized at 121° C. for 60 minutes, cooled, and inoculated with 200 ml. of the growing 32-hour old culture from Stage II. Each fermentation mixture is incubated for 32 hours at 29–31° C. with aeration at a rate of 9.5 cubic feet per minute.

Stage IV: A nutrient medium is prepared having the composition as described in Stage III but containing in addition 4.0% (weight/volume) of glycerol. A polypropylene glycol antifoaming agent is added. One hundred fifty gallons of this mixture is placed into each of four 200-gallon fermentors, sterilized with heat, cooled, and inoculated with 15 gallons of the growing 32-hour old culture from Stage III. Each fermentation mixture is incubated for 128 hours at 29 to 31° C. with aeration at a rate of 17 to 34 cubic feet per minute. A polypropylene glycol antifoaming agent is added in portions as required.

Isolation and purification of product: The broths from the four fermentors are combined and the combined broth (610 gallons; pH 6.9) is stirred for one hour with 127 liters of carboxylic acid resin in the ammonium form. The resin with adsorbed material is allowed to settle, and suspended solid impurities are removed by washing the resin with water. The washed resin is then charged into a 12-inch diameter column already containing 113 liters of fresh carboxylic acid resin, ammonium form, as a bottom layer. The packed column is washed with 4350 gallons of 0.1 M ammonium hydroxide to remove impurities and the ambutyrosin product is collected by eluting the column with 500 gallons of 1 M ammonium hydroxide. This eluate is concentrated in vacuo to 47.5 gallons, adjusted to pH 7 with dilute sulfuric acid, and passed through a column of 3.5 liters of carboxylic acid resin, ammonium form, at the rate of 0.03 ml./ml. resin/minute. The resin is washed with 2 liters of water and then placed on top of 10.5 liters of fresh resin packed in a 4-inch diameter glass column. The column is washed with 273 gallons of 0.1 M ammonium hydroxide to remove impurities and then eluted with a total of 45 gallons of 1 M ammonium hydroxide in 3 equal portions. The first 15-gallon fraction contains most of the ambutyrosin product and is concentrated in vacuo to a volume of 4 liters, adjusted to pH 6.2 with dilute sulfuric acid, and stirred for one hour with 813 g. of water-washed activated carbon and 400 g. of acid-washed diatomaceous earth. Materials such as Darco G-60 and Celite 545 can be used. The mixture is filtered and the filter cake washed with 80 liters of water. The filtrate and wash are combined, concentrated in vacuo to a volume of 4 liters, filtered, and lyophilized. The product is ambutyrosin sulfate salt, specific rotation $[\alpha]_D^{25} = +29°$ (2% in water). By microanalysis it contains 31.85% carbon; 6.28% hydrogen; 8.83% nitrogen; 8.01% sulfur; 24.01% sulfate. In water it has pK'a values of 6.5, 8.1, and 9.5.

EXAMPLE 3

Stage I: A spore suspension of *Bacillus circulans* NRRL B-3313 in 0.1% sterile sodium heptadecyl sulfate solution is prepared as described in Example 1, Stage I.

Stage II: A nutrient medium having the following composition (weight/volume) is prepared.

| | Percent |
|---|---|
| Soybean meal, 44% protein (solvent extracted) | 1.0 |
| Animal peptone | 1.75 |
| Ammonium sulfate | 0.4 |

Water to make 100%.

The pH of the medium is adjusted to 7.5 with 10 N sodium hydroxide and then 0.5% (weight/volume) of calcium carbonate is added.

Twelve liters of this medium is placed in a 30-liter fermentor. The medium is sterilized by heating at 121° C. for 90 minutes, allowed to cool, and inoculated with 10 ml. of a sodium heptadecyl sulfate suspension of *Bacillus circulans* NRRL B-3313 from Stage I. The mixture is incubated for 33 hours at 28–30° C. with agitation and aeration at a rate of 6 liters of air per minute. During this period, 400 ml. of a polypropylene glycol antifoaming agent is added in portions as required to control foaming.

Stage III: Fifteen gallons of a nutrient medium, having the same composition as described in Stage II (pH 7.5), is heat sterilized in a 30-gallon fermentor, cooled, and inoculated with 400 ml. of the growing 33-hour old culture from Stage II. The inoculated medium is incubated for 32 hours at 28–30° C. with aeration at a rate of 6.25 cubic feet of air per minute. A polypropylene glycol antifoaming agent is added as required.

Stage IV: Three hundred gallons of a nutrient medium, having the same composition as that used in Stage II (pH 7.5), is heat sterilized, cooled, and inoculated with 15 gallons of the growing 32-hour old culture from Stage III. The mixture is incubated for 24 hours at a temperature of 29–31.5° C. with aeration at a rate of 45 cubic feet of air per minute. A polypropylene glycol antifoaming agent is added as required.

Stage V: A nutrient medium is prepared, having the composition as described in Stage II, but containing in addition 4.0% (weight/volume) of glycerol. The medium, pH 7.5, also contains the polypropylene glycol antifoaming agent. Twelve hundred gallons of this medium is placed in each of two 2000-gallon fermentors, sterilized with heat, cooled, and inoculated with 150 gallons of the growing 24-hour old culture from Stage IV. The fermentation is carried out for 120 hours at 28–31° C. with aeration at a rate of 60 cubic feet of air per minute and addition of more antifoaming agent as required.

Isolation and purification of product: The broths are combined and the combined broth (2920 gallons) is stirred for 1½ hours with 508 liters of carboxylic acid resin in the ammonium form. The resin with adsorbed material is allowed to settle and is collected and washed free of suspended solids with water. The washed resin is charged into a column already containing 46 liters of fresh carboxylic acid resin, ammonium form, as a bottom layer. The resin column is washed with 3000 gallons of 0.1 M ammonium hydroxide to remove impurities and the ambutyrosin product is removed by elution with 1000 gallons of 1 M ammonium hydroxide. This eluate is concentrated in vacuo to a volume of 32 gallons, adjusted to pH 7 with dilute sulfuric acid, and filtered.

The operations described in Stages I, II, III, IV, and V and the isolation procedure described above are repeated to give a second concentrated ambutyrosin eluate of 57 gallons. This eluate is adjusted to pH 7 with dilute sulfuric acid and filtered.

For further processing, the two eluates are combined to give a solution having a volume of 89 gallons.

The combined solution is diluted to 300 gallons with water and passed through a column of 30 liters of carboxylic acid resin, ammonium form, at the rate of 900 ml. per minute. The resin is washed with 15 gallons of water and then placed on top of 91 liters of fresh resin in a 12-inch diameter glass column. The packed column is washed with 1950 gallons of 0.1 M ammonium hydroxide to remove impurities and the ambutyrosin product is removed by elution with 400 gallons of 1 M ammonium hydroxide, collected in portions. The first 178 gallons of 1 M ammonium hydroxide contains most of the ambutyrosin. It is concentrated in vacuo to remove the ammonia. For further purification the product is adsorbed on 35 liters of fresh carboxylic acid resin, ammonium form, and this resin is placed on top of 105 liters of fresh resin in a 12-inch diameter column. The packed column is washed with 2000 gallons of 0.1 M ammonium hydroxide to remove impurities and the ambutyrosin product is removed by elution with 200 gallons of 1 M ammonium hydroxide. This eluate is concentrated in vacuo to a volume of 23.5 gallons, adjusted to pH 6.0 with dilute sulfuric acid, stirred for one hour with 12 kg. of activated carbon and 12 kg. of diatomaceous earth, and filtered. The filter cake is washed with water until the combined volume of the initial filtrate with washings is 220 gallons. This solution is concentrated in vacuo to a volume of 8 gallons and is then filtered and lyophilized. The product, ambutyrosin sulfate salt, has a specific rotation $[\alpha]_D^{25} = +29.3°$ (2% in water). By microanalysis the product contains 32.08% carbon; 6.36% hydrogen; 9.08% nitrogen; 8.14% sulfur. The microanalytical values calculated for

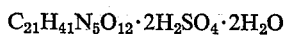

are 32.02% carbon; 6.27% hydrogen; 8.89% nitrogen; 8.14% sulfur.

Acid-addition salts of ambutyrosin are converted to the free base by mild treatment in the cold with a base such as sodium hydroxide, potassium carbonate, or potassium bicarbonate; or by ion exchange procedures. For example, an aqueous solution of the sulfate salt is passed over a strong anion exchange resin in the hydroxide form. A highly cross-linked resin such as Dowex 1X16 or a similar resin can be used. The product is recovered in free base form by passing the solution through the resin and washing the resin with water. Alternatively, an aqueous solution of the sulfate salt is placed on a column containing carboxylic acid resin in the ammonium form. The resin with adsorbed material is washed with water and with small quantities of 0.1 M ammonium hydroxide and then ambutyrosin free base is eluted from the column with 1 M ammonium hydroxide.

A solution of 6.169 g. of ambutyrosin and 5.911 g. of sodium formaldehyde bisulfite in 20 ml. of water is allowed to stand for 2 days. Methanol, 210 ml., is then added with stirring. The gummy product is triturated until it becomes a solid. This solid product is collected on a filter and washed with methanol. It is the sodium salt of ambutyrosin tetra-(N-methanesulfonic acid). For purification, it is redissolved in water and reprecipitated by the addition of methanol. The corresponding potassium salt of ambutyrosin tetra-(N-methanesulfonic acid) is formed similarly from potassium formaldehyde bisulfite. These alkali metal salts of ambutyrosin tetra-(N-methanesulfonic acid) are pharmaceutically-acceptable derivatives having the antibacterial properties of ambutyrosin itself.

EXAMPLE 4

Ambutyrosin, as obtained by any of the preceding examples, can be separated into the components ambutyrosin A and ambutyrosin B by the following procedure. An ion exchange resin in the borate form is prepared as follows. Three liters of strong anion exchange resin in the chloride form is packed into a 2-inch diameter glass column. A resin such as Dowex 1X2, 50–100 mesh can be used. The resin is converted to the hydroxide form by passage of 16 liters of 2 M sodium hydroxide. It is then washed with water (about 9.5 liters) until the pH of the effluent is 9.2, treated with 17.5 liters of 5% boric acid solution, and finally washed with water until the pH of the effluent is approximately 5.5.

A 6.01 g. sample of ambutyrosin containing ambutyrosin A and ambutyrosin B is dissolved in 15 ml. of water and added to the column. The column is eluted with 6.42 liters of water, and fractions are collected at about 7 ml. per minute. Fractions containing the product are identified and combined. For example, in a typical separation the product is found in the eluate following elution with 2.25 liters of water and continuing until the column has been eluted with a total of 4.95 liters of water. The product obtained by elution with water in this manner contains ambutyrosin A free of ambutyrosin B.

The column is then eluted in succession with 4 liters of 1% boric acid, 2 liters of 2% boric acid, and finally with 5% boric acid solution. The eluate is collected in fractions and the fractions containing the product are identified and combined. In a typical separation, the product is found mainly in fractions corresponding to effluent volume of 2.64 to 4.00 liters after the application of 5% boric acid. This product consists of ambutyrosin B essentially free of ambutyrosin A.

Ambutyrosin A can be further purified as follows. Fractions from the aforementioned resin column, corresponding to effluent volume 3.0–3.6 liters (using water as eluant), are passed through a column containing 11 ml. of carboxylic acid resin, ammonium form, in about 20 hours. A resin such as Amberlite IRC–50 can be used. This column is washed with water, then with 40 ml. of 0.1 M ammonium hydroxide to remove impurities. The ambutyrosin A is then eluted with two 80 ml. portions of 1 M ammonium hydroxide. The first portion is evaporated in vacuo and lyophilized to give 584 mg. of ambutyrosin A containing a trace of boron.

In order to remove the boron, this product is dissolved in 5 ml. of water and the solution is passed through 4 ml. of a boron-specific anion exchange resin. A resin such as Amberlite XE 243, in the free base form, can be used. The column is eluted with an additional 8 ml. of water and the effluent solution is lyophilized to give ambutyrosin A (free base) containing no boric acid.

A solution of this boron-free ambutyrosin A in 8 ml. of water is passed through 6 ml. of a strong anion exchange resin in the hydroxide form. A resin such as Dowex 1X16 can be used. The column is eluted with an additional 15 ml. of water and the effluent solution is lyophilized to give purified ambutyrosin A as a free base having the following properties. The specific rotations, $[\alpha]_\lambda^{25}$ (1.46% in water) at various wavelengths are as follows: +26.0° at 589 millimicrons: +27.2° at 578 millimicrons; +30.4° at 546 millimicrons; +49.5° at 436 millimicrons; +74.4° at 365 millimicrons. Following drying in vacuo at 100° C. for 24 hours, microanalysis shows 44.94% carbon; 7.05% hydrogen; and 12.23% nitrogen. In potassium bromide, the product has infrared absorption maxima at 700, 1028, 1090, 1340, 1390, 1457, 1498,

EXAMPLE 5

Another example of the separation of ambutyrosin into the components ambutyrosin A and ambutyrosin B is as indicated below. A strong anion exchange resin in the borate form is prepared as follows. A strong anion exchange resin in the chloride form, 3.4 liters, is packed into a 5.4-centimeter diameter column. A resin such as Dowex 1X1, 50–100 mesh can be used. This resin is converted to the hydroxide form with 2 M sodium hydroxide, washed with water until the pH of the effluent is 10.5, then treated with 12 liters of 5% boric acid, and finally washed with water until the pH of the effluent is 6.9.

A solution of 4.03 g. of ambutyrosin in 7.5 ml. of water is added to the column. The column is eluted with 11 liters of water at a rate of 14 ml. per minute and fractions of eluate are collected. The fractions beginning at an effluent volume of 3.96 liters and ending at an effluent volume of 6.97 liters contain a product which is ambutyrosin A essentially free of ambutyrosin B. These fractions are combined and the ambutyrosin A is isolated by adsorption on a carboxylic acid resin, ammonium form, and subsequent elution with 1 M ammonium hydroxide as described before. The column containing the strong anion exchange resin in the borate form is then eluted with 7.1 liters of 2.5% boric acid, and finally with 5 liters of 5% boric acid. A product is collected from the column by elution with 5% boric acid. Most of this product is found in the fractions corresponding to an effluent volume of 0.5 to 3.2 liters of 5% boric acid. It is ambutyrosin B essentially free of ambutyrosin A.

For further purification, the ambutyrosin B solution in 5% boric acid is passed very slowly through a 0.6-centimeter diameter column containing 5 ml. of carboxylic acid resin, ammonium form. The column is washed with water and then eluted with 90 ml. of 1 M ammonium hydroxide. The ammonium hydroxide eluate is evaporated in vacuo and lyophilized to give 624 mg. of ambutyrosin B (free base) containing a small amount of boric acid as an impurity. An aqueous solution of this product is passed slowly through 4 ml. of boron-specific anion exchange resin, free base form, during 3 hours and the column is eluted with an additional 10 ml. of water. The effluent solution is lyophilized to give 609 mg. of ambutyrosin B containing only 0.02% boron and having the following properties. The specific rotations, $[\alpha]_\lambda^{25}$ (1.5% in water) at various wavelengths are as follows: $+33.0°$ at 589 millimicrons; $+34.0°$ at 578 millimicrons; $+38.5°$ at 546 millimicrons; $+64.0°$ at 436 millimicrons. Following drying in vacuo at 100° C. for 24 hours, microanalysis shows 42.79% carbon; 7.53% hydrogen; and 11.45% nitrogen (corresponding to a dihydrate). In potassium bromide, the product has infrared absorption maxima at 700, 1026, 1100, 1345, 1390, 1458, 1497, 1549, 1580, 1650, 2938, 3040, 3315, and 3370 reciprocal centimeters.

We claim:

1. A member of the class consisting of $N^1$-(4-amino-2-hydroxybutyryl) - 4 - O - (2,6 - diamino - 2,6-dideoxy-D-glucopyranosyl) - 5 - O - D-xylafuranosyl-2-deoxystreptamine, $N^1$-(4-amino-2-hydroxybutyryl)-4-O-(2,6-diamino-2,6 - dideoxy - D-glucopyranosyl)-5-O-D-ribofuranosyl-2-deoxystreptamine, and acid-addition salts thereof.

2. A compound according to claim 1 which is $N^1$-(4-amino - 2 - hydroxybutyryl) - 4 - O - (2,6-diamino-2,6-dideoxy - D - glucopyranosyl) - 5 - O - D - xylofuranosyl-2-deoxystreptamine.

3. A compound according to claim 1 which is an acid-addition salt of $N^1$-(4-amino-2-hydroxybutyryl)-4-O-(2,6-diamino - 2,6 - dideoxy - D - glucopyranosyl) - 5 - O - D-xylofuranosyl-2-deoxystreptamine.

4. A compound according to claim 1 which is $N^1$-(4-amino - 2 - hydroxybutyryl) - 4 - O - (2,6 - diamino - 2,6-dideoxy - D - glucopyranosyl) - 5 - O - D - ribofuranosyl-2-deoxystreptamine.

5. A compound according to claim 1 which is an acid-addition salt of $N^1$-4-amino-2-hydroxybutyryl)-4-O-(2,6-diamino - 2,6 - dideoxy - D - glucopyranosyl) - 5 - O - D-ribofuranosyl-2-deoxystreptamine.

6. A product according to claim 1 containing a major proportion of $N^1$ - (4-amino-2-hydroxybutyryl)-4-O-(2,6-diamino - 2,6 - dideoxy - D - glucopyranosyl) - 5 - O - D-xylofuranosyl-2-deoxystreptamine and a minor proportion of $N^1$-(4-amino-2-hydroxybutyryl)-4-O-(2,6-diamino-2,6 - dideoxy - D-glucopyranosyl)-5-O-D-ribofuranosyl-2-deoxystreptamine.

7. A product according to claim 6 in the form of an acid-addition salt.

8. A product according to claim 6 in the form of a sulfate salt.

ELBERT L. ROBERTS, Primary Examiner

U.S. Cl. X.R.

195—211.5; 260—96